United States Patent [19]

Schwartz et al.

[11] Patent Number: 4,698,262

[45] Date of Patent: Oct. 6, 1987

[54] FLUORESCENTLY LABELED MICROBEADS

[75] Inventors: Abraham Schwartz, Durham; Joel Williams, Cary; Robert D. Stevens, Durham, all of N.C.

[73] Assignee: Becton, Dickinson and Company, Franklin Lakes, N.J.

[21] Appl. No.: 881,508

[22] Filed: Jun. 30, 1986

Related U.S. Application Data

[63] Continuation of Ser. No. 747,396, Jun. 21, 1985, abandoned, which is a continuation of Ser. No. 604,763, Apr. 27, 1984, abandoned.

[51] Int. Cl.[4] .................. B32B 27/30; C08K 5/01; C08K 5/02
[52] U.S. Cl. .................... 428/402; 524/458; 526/201; 526/320; 526/332; 523/223; 521/60; 521/149; 525/284; 525/243
[58] Field of Search ............ 252/301.35; 523/201, 523/223; 524/458; 526/201, 88, 320, 332; 428/407, 402; 521/60, 149; 525/243, 284

[56] References Cited

U.S. PATENT DOCUMENTS

| | | | |
|---|---|---|---|
| 3,544,500 | 12/1970 | Osmond et al. | 428/407 X |
| 3,911,193 | 10/1975 | Resz et al. | 428/407 |
| 3,976,629 | 8/1976 | Hayward et al. | 428/407 X |
| 4,035,316 | 7/1977 | Yen et al. | 526/225 X |
| 4,105,598 | 8/1978 | Yen et al. | 521/53 |
| 4,143,203 | 3/1979 | Rigopulos et al. | 428/403 X |
| 4,194,877 | 3/1980 | Peterson | 526/303 X |
| 4,206,094 | 6/1980 | Yen et al. | 521/84 X |
| 4,210,723 | 7/1980 | Dorman et al. | 435/180 |
| 4,225,783 | 9/1980 | Palin et al. | 424/3 X |
| 4,247,434 | 1/1981 | Vanderhoff et al. | 523/201 |
| 4,267,234 | 5/1981 | Rembaum | 428/407 X |
| 4,332,694 | 6/1982 | Kálal et al. | 428/407 X |
| 4,336,173 | 6/1982 | Ugelstad | 523/205 |
| 4,459,378 | 7/1984 | Ugelstad | 524/460 X |

*Primary Examiner*—Joseph L. Schofer
*Assistant Examiner*—F. M. Teskin
*Attorney, Agent, or Firm*—Richard E. Brown

[57] ABSTRACT

Highly uniform polymeric microbeads of a predetermined size, preferably having an attached fluorescent label on the surface, are prepared by causing seed particles to swell by absorption of a plurality of low molecular weight substances, at least one of which is a monomer having a reactive functional group. After absorption, the monomer is internally polymerized, and the reactive functional group is preferably reacted with a polyfunctional spacing agent thereby to provide a second reactive functional group. The latter is then reacted with a fluorescent label to provide the labeled microbead.

3 Claims, No Drawings

FLUORESCENTLY LABELED MICROBEADS

This application is a continuation, of application Ser. No. 747,396, filed June 21, 1985 which is a continuation of application Ser. No. 604,763, filed Apr. 27, 1984, both now abandoned.

BACKGROUND OF THE INVENTION

1. Field of the Invention

The present invention relates to a method for making uniform polymeric microbeads of predetermined size and further relates to polymeric microbeads which have an attached detectable label.

2. Description of the Prior Art

Flow cytometry is the preferred method for the rapid detection and measurement of a variety of cellular constituents. In this technique, measurement of large numbers of individual cells in monodisperse fluid suspension is done by electrical and/or optical techniques. Physical sorting of selected cell subpopulations may also be performed. Fluorescence activated flow cytometry depends on measuring the fluorescent emission of each cell, and provides rapid and accurate statistical data at rates of up to 5000 cells per second, or perhaps higher. Cells which exhibit native fluorescence can be used, or fluorescence can be induced by binding a suitable fluorescent label to the cell structure being analyzed.

Flow cytometers are used to differentiate, count and separate subpopulations of cells by either size, fluorescence or other useful parameters. In general, cells in suspension are introduced to the center of a liquid stream and caused to pass, substantially one at a time, through the focused beam from a light source. In passing through the light beam, the cell, if labeled with a fluorescent marker, is caused to emit one or more fluorescent signals. Analysis of the intensity, color or polarization of the fluorescent signal allows individual characterization of the cell.

There is a need for a method to calibrate a fluorescence activated flow cytometer by means of a standard cell having a known quantity of fluorescent molecules per cell. The principal requirement for a standard cell is stability and long shelf time. Of course, due to the transient lifetime of living cells, it is impossible to prepare suitable standard cells from living cells. Polymeric particles having the same size (average 4 to 10 microns) and conformation as living cells could be used as flow cytometry standards if they could be suitably labeled.

Polymeric microparticles in general have been prepared by the conventional technique of emulsion polymerization. By this technique, microparticles with a high degree of size uniformity can be obtained, but these particles have been limited to about 2 microns or less in diameter. Larger particles have been obtained by a variety of procedures from pre-formed polymers, however, these techniques all give particles of wide variability in size, shape and other physical properties.

U.S. Pat. No. 4,336,173 to Ugelstad discloses a method for preparing uniform microbeads of larger size than those available by emulsion polymerization. In the Ugelstad method, a dispersion of microparticles of small, but uniform, size produced by emulsion polymerization is contacted with a first substance which is absorbed into the particles to cause some swelling of the particles. Subsequently, a second substance, usually a polymerizable monomer, is likewise absorbed into the particles. Upon internal polymerization of this monomer, the particle undergoes additional swelling. The desired particle size is reached by absorbing pre-calculated amounts of the first and second substances into the microparticle.

Preparation of microbeads in which a dye is incorporated is known. In U.S. Pat. No. 4,194,877 to Peterson, polymeric microbeads are disclosed in which a dye is emulsion copolymerized with an acrylic monomer to provide a product in which the molecules of the dye are part of the polymer chains. U.S. Pat. No. 4,035,316 to Yen discloses the preparation by emulsion polymerization of biocompatible polyacrylate microbeads and attachment of a fluorescent dye thereto through reactive functional groups. In these cases, the particles obtained, although they contain a dye, are limited to a size of about 3 microns or less and are thus substantially smaller than a cell.

SUMMARY OF THE INVENTION

The present invention comprises a method for making microbeads of highly uniform and pre-determined size having attached thereto a pre-determined quantity of a fluorescent label. The microbeads of the invention are prepared from a dispersion of polymeric microparticles, hereinafter referred to as seed particles, which are highly uniform in size but substantially smaller than the size of a cell. The dispersion of seed particles is contacted with a polymerizable monomer having a reactive functional group whereby the monomer is absorbed into the seed particles. Polymerization of the monomer is induced within the seed particles to cause swelling of the seed particles to provide microbeads of the desired size. The monomer is selected such that the reactive functional group is stable during the absorption and polymerization stages. Reaction of the reactive functional group with an appropriate polyfunctional spacing agent provides a second reactive functional group. The second reactive functional group is reacted with a fluorescent dye to provide the microbeads with a detectable label on their surface. The fluorescently labeled microbeads are suitable for use as flow cytometry standards.

Prior art microbeads do not have the particular combination of properties which makes the microbeads of the present invention useful for various functions, in particular, for calibration of flow cytometers. Thus, the microbeads of the present invention are substantially uniform in size and shape. The size may be pre-determined, and preferably falls within the size range of a cell. A fluorescent dye may be attached, preferably to the surface of the microbead, whereby the fluorescence emission spectrum of the dye is substantially the same as the spectrum of the dye in solution. The amount of dye which may be attached may be varied. Because the size of the microbeads can be pre-determined, a series of uniform, fluorescently labeled microbeads having a range of sizes covering the size range of cells may be prepared. This series of size-graduated microbeads may serve as a set of standard cell substitutes for calibration of flow cytometers.

DETAILED DESCRIPTION OF THE INVENTION

While this invention is satisfied by embodiments in many different forms, there will herein be described in detail preferred embodiments of the invention, with the understanding that the present disclosure is to be considered as exemplary of the principles of the invention and is not intended to limit the invention to the embodiments illustrated. The scope of the invention will be measured by the appended claims and their equivalents.

The seed particles useful in the present invention may be of any polymer which can be obtained as a dispersion of small but uniform particles and which can absorb a monomer and swell upon internal polymerization of that monomer. The seed particles may be of any size or shape, but it is desirable that all the particles fall within a size range of about 10% of the mean. The dispersion of seed particles is preferably obtained by emulsion polymerization of a suitable monomer, but may also be obtained by dispersion of particles of a pre-formed polymer. Among the polymers which can be used are polyethylenes, polyvinylpyridines, polyacrylates, polymethacrylates, polystyrenes, polyvinyltoluenes and the like.

An aqueous emulsion of a substance, hereinafter referred to as the swelling agent, to be absorbed into the seed particle is prepared and homogenized to a particle size of about 0.5 micron. The swelling agent is a material of very low water solubility, preferably $10^{-2}$ g/l or less, and preferably has a molecular weight of 5000 or less. Most preferably, the solubility will be about $10^{-4}$ g/l and the molecular weight about 100-300. Exemplary swelling agents include substances such as 1-chlorodedecane, hexadecane and naphthalene. This emulsion in addition contains a conventional polymerization initiator, such as peroxide, persulfate or azo compound and is stabilized with a conventional cationic, anionic or non-polar emulsifying agent such as but not limited to, hexadecyltrimethyl ammonium chloride, sodium lauryl sulfate (SLS) or nonyl phenol ethyoxylate having 10-50 moles of ethylene oxide per mole of nonyl phenol. Any suitable amount of swelling agent may be used depending on the amount of swelling desired.

The seed particles are suspended in water and the suspension is added to the emulsion of the swelling agent. A substance, as, for example, acetone, is added to the reaction mixture to aid in the transport of the swelling agent through the reaction mixture, thereby to enhance the rate of absorption. Absorption is completed by stirring the mixture for from about 1 hour to about 24 hours, preferably 12 to 18 hours, at a temperature of from about $-10°$ to about $10°$ C., preferably $0°-5°$ C. The acetone is then removed by stirring the mixture under a partial vacuum.

It is preferred, but not essential, to add a stabilizing agent to the dispersion of swelled seed particles before the addition of monomer and polymerization thereof described below. A preferred stabilizing agent is a salt such as a solution of an alkali metal halide in an aqueous solution of the emulsifying agent used for the swelling agent. Among the salts which may be used are the chlorides, bromides and iodides of lithium, sodium, potassium, and cesium, with potassium chloride being preferred. The amount of halide solution which may be used is from about 0.1 to about 60 parts by volume based on volume parts of the seed particle, with about 1 to 20 volume parts preferred.

To the stabilized dispersion there is added a monomer or mixture of monomers, having a first reactive functional group, selected from the group of monomers of formula 1:

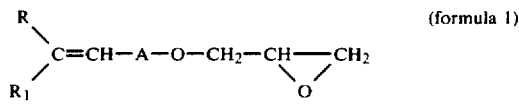

wherein R and $R_1$ is independently hydrogen or lower alkyl of 1 to 6 carbon atoms and A is a methylene or carbonyl group. In formula 1, the epoxide group serves as a first reactive functional group. In a preferred group of monomers, A is a carbonyl group. The most preferred monomer is glycidyl methacrylate. Other preferred monomers are, for example, glycidyl acrylate, glycidyl dimethacrylate or glycidyl allyl ether. In addition to one or more monomers of formula 1, there may optionally be included in the monomer one or more monomers in accordance with formula 2:

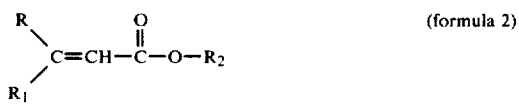

wherein R and $R_1$ are as defined above and $R_2$ is lower alkyl.

The monomer or mixture of monomers is preferably emulsified before addition to the dispersion of swelled particles. This emulsion is prepared by homogenizing the monomer or monomer mixture with the stabilizing solution described above. Preferably, about equal volume parts of monomer or monomer mixture and stabilizing solution are used. The amount of monomer or mixture of monomers to be added depends on the amount of swelling agent added and the size desired for the final microbead, and can be from about 0.1 parts to about 50 parts based on volume parts of the seed particle.

The term microbead as used herein is intended to mean a bead of 50 microns or less. For purposes of the present invention, it is contemplated to use microbeads in the size range of 1-20 microns, preferably 4-10 microns. Although spherical microbeads are preferred, the present invention includes other shapes as well.

Absorption of the monomer into the seed particle is accomplished by homogenization of the mixture of the stabilized dispersion of swelled microbeads and the monomer emulsion. The mixture is then heated under an inert gas atmosphere to effect polymerization. The polymer thereby obtained has the formula 3, wherein R, $R_1$ and A are as previously defined, and is present in the microbead from about 0.1 to about 50% by weight:

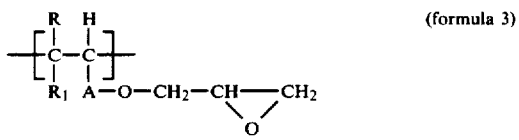

The epoxide from formula 3 serving as the first reactive functional group, which after polymerization is on the surface of the microbead, is reacted with a polyfunctional spacing agent having a reactive group on one end to react with the epoxide and a reactive group on the other end to react with a reagent to introduce detectable label. The spacing agent is a compound of formula 4:

X—Q—Y  (formula 4)

wherein X may be selected from the group consisting of amino, hydroxyl or sulfhydryl, Q may be selected from the group consisting of a straight or branched chain alkylene group of 2 to 10 carbon atoms, an aryl group or a heterocyclic group, and Y may be any functional group which can react with the detectable label, such as amino, hydroxyl, sulfhydryl, halo or carboxyl. In a preferred group of spacing agent, Q is a straight or branched chain alkylene group of 2 to 10 carbon atoms and X and Y are amino, hydroxyl or sulfhydryl. In a particularly preferred group of spacing agents, X and Y are amino. The most preferred spacing agent is $1,3$-diaminopropane. Exemplary of other spacing agents are the following:

1,6-diaminohexane
1,4-butanediol
1,5-dimercaptopentane
6-aminocaproic acid
3-chloropropylamine
p-phenylenediamine
propanolamine The reaction is carried out by stirring the microbeads in an aqueous solution of the spacing agent. The polymer thereby obtained has formula 5:

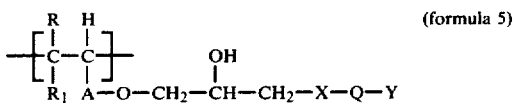

(formula 5)

wherein R, $R_1$, A, Q and Y are as previously defined and X is NH, oxygen or sulfur, and is present in the microbead from about 0.1 to about 50% by weight. In this polymer, the group Y serves as a second reactive functional group.

Group Y from the spacing agent, serving as the second reactive functional group, is reacted with a reagent to introduce a detectable label. Various reagents may be used, as, for example, enzymes, radioactive compounds, or preferably, fluorescent dyes. Exemplary of fluorescent dyes which may be used are, preferably, fluorescein derivatives such as fluorescien isothiocyanate (FITC), rhodamine derivatives such as tetramethylrhodamine isothiocyanate or Texas Red (rhodamine sulfonyl chloride), and phycobiliprotein derivatives. In addition, if desired, two or more different fluorescent dyes may be attached to the same batch of microbeads by reaction of the second reactive functional group with the selected dyes. For example, a batch of microbeads may be reacted first with FITC and then with Texas Red.

The reaction between the second reactive functional group and the dye is best carried out by adding the dye in a suitable solvent, as, for example, dimethylformamide (DMF), to a suspension of the microbeads in the same solvent and stirring until the reaction is complete. The fluorescence level of any microbead of any size can be selected up to the carrying capacity of the microbead as limited by the number of available second reactive functional groups on the surface, and can be modified by exposing the microbead to different concentrations of the dye solution. Determination of the fluorescence level may be carried out, for example, by removal of aliquots of the suspension from the dye solution and measurement of the fluorescence emission with a flow cytometer.

After attachment of the fluorescent dye, the microbead contains a polymer of formula 6:

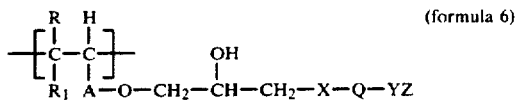

(formula 6)

wherein R, $R_1$, A and Q are as previously defined, X is amino, oxygen or sulfur, Y is amino, oxygen, sulfur or carbonyl, and Z is a fluorescent dye. This polymer is present in the microbead from about 0.1 to about 50% by weight.

The fluorescently labeled microbead of this invention, when in suspension, has a fluorescence emission spectrum which is substantially identical to the fluorescence emission spectrum of the dye in solution. This property arises because the dye is attached to the bead surface and separated therefrom by a distance, defined by the length of the diamine spacer, sufficient to allow maximum contact of the dye with the solution. Because the fluorescent microbead of the invention is about the same size as a cell and shows the same emission spectrum as the dye in solution, it may be used as a cell substitute for calibration of a fluorescence activated flow cytometer.

The following examples are provided to further illustrate the invention, but are in no way to be construed as limiting of the scope of the invention.

EXAMPLE 1

Eleven ml. of 1-chlorododecane were added to a mixture of 10 ml of dichloroethylene, 0.9 g of 99% benzoyl peroxide and 40 ml of 0.25% SLS. The mixture was homogenized for 0.5 hour to give an emulsion of average droplet size of 0.5 micron. Twenty ml of a 10% suspension of polyvinyltoluene microbeads of 2.02 microns in diameter, and 20 ml of 30% acetone-water were added and the mixture was stirred for 18 hours at 4° C.

Two ml of the above mixture were added to 10 ml of water and the mixture was stirred for 1 hour at 20 mm of Hg to remove the acetone, then treated with 30 ml of 1.25 millimolar potassium chloride solution. A homogenized mixture of 14.25 ml of methylmethacrylate, 0.75 ml of glycidyl methacrylate, and 15 ml of 0.25% SLS in 1.25 millimolar potassium chloride solution was added. The mixture was heated to 70° C. for 16 hours with stirring under nitrogen. After washing, the microbeads were stirred with 100 ml of a 10% aqueous solution of 1,3-diaminopropane for 12 hours, washed again, and a 1% suspension in 0.1M sodium carbonate solution containing 0.1% polysorbate 20, pH 10, was prepared. To this suspension was added a solution of 0.2 g of FITC in 2 ml of DMF, and the mixture was stirred for 1 hour. The fluorescently labeled microbeads thus obtained were 5.5 microns in diameter.

EXAMPLE 2

Four ml of the polyvinyltoluene microbead suspension in 30% acetone-water, prepared as described in Example 1, were added to 20 ml of water. The mixture was stirred for 1 hour at 20 mm of Hg to remove the acetone and treated with 60 ml of 1.25 millimolar potassium chloride solution. A homogenized monomer mixture of 36.0 ml of methylmethacrylate, 2.0 ml of glycidyl methacrylate, and 40 ml of 0.25% SLS in 1.25 millimolar potassium chloride solution was added. The mixture was heated to 70° C. for 14 hours with stirring under nitrogen. After washing, the microbeads were stirred with 100 ml of a 10% aqueous solution of 1,3-diaminopropane for 12 hours, washed again, and a 1% suspension in 0.1M sodium carbonate solution containing 0.1% polysorbate 20, pH 10, was prepared. To this suspension was added a solution of 0.2 g of FITC in 2 ml of DMF, and the mixture was stirred for 1 hour. The fluorescently labeled microbeads thus obtained were 12.1 microns in diameter and were of high fluorescent intensity as measured by a flow cytometer.

EXAMPLE 3

Example 2 was repeated exactly except that the homogenized monomer mixture consisted of 11.0 ml of methylmethacrylate, 0.6 ml of glycidyl methacrylate, and 12.4 ml of 0.25% SLS in 1.25 millimolar potassium chloride solution. The fluorescently labeled microbeads thus obtained were 6.1 microns in diameter.

EXAMPLE 4

The fluorescently labeled microbeads of Example 2 were washed 4 times in 0.1M sodium phosphate solution containing 0.1% polysorbate 20, pH 7.2. The equivalent fluorescence was determined to be $4.8 \times 10^6$ soluble laser grade fluorescein molecules per microbead. The fluorescence appeared green under 485 nm illumination using a 515 nm long pass filter in a fluorescence microscope. The emission and excitation spectra of the microbeads were substantially identical to those of FITC in a 0.1M sodium phosphate solution containing 0.1% polysorbate 20, pH 7.2.

EXAMPLE 5

Four ml of the polyvinyltoluene microbead suspension in 30% acetone-water prepared as described in example 1, were added to 20 ml of water. The mixture was stirred for 1 hour at 20 mm of Hg to remove the acetone and treated with 60 ml of 1.25 millimolar potassium chloride solution. Seventy eight ml of a homogenized monomer mixture consisting of 36.0 ml of methylmethacrylate, 2.0 ml of glycidyl methacrylate, and 40 ml of 0.25% SLS in 1.25 millimolar potassium chloride solution were added. The mixture was heated to 70° C. for 14 hours with stirring under nitrogen. After washing, the microbeads were stirred with 100 ml of a 10% aqueous solution of 1.3-diaminopropane for 12 hours, washed again, and a 1% suspension in 0.1M sodium carbonate solution containing 0.1% polysorbate 20 was prepared.

A solution of 5.8 mg of FITC in 4 ml of DMF was prepared and serially diluted 1:4 with DMF. To 0.3 ml of each FITC-DMF dilution was added 5 ml of the above 1% microbead suspension. The suspensions were stirred for 1 hour and the equivalent fluorescence of each was determined. The results are given in the following Table:

| Dilution | No. of equivalent soluble laser grade fluorescin molecules per microbead |
|---|---|
| None | $4.8 \times 10^6$ |
| 1:1 | $3.0 \times 10^6$ |
| 1:2 | $4.0 \times 10^5$ |
| 1:3 | $3.5 \times 10^4$ |
| 1:4 | $2.7 \times 10^4$ |

EXAMPLE 6

In accordance with the procedures of Example 5 for preparation and fluorescenation of microbeads, the following set of size-fluorescent microbead standards was prepared by varying the quantities of monomer homogenate and the FITC-DMF dilution:

| No. | Monomer Homogenate (Total ml.) | FITC-DMF dilution | Size of bead (microns) | No. of equivalent soluble laser grade fluorescein molecules/ microbead |
|---|---|---|---|---|
| 1 | 43 | 1:16 | 7.8 | $4.3 \times 10^5$ |
| 2 | 27 | 1:64 | 6.3 | $2.8 \times 10^5$ |
| 3 | 18 | 1:254 | 5.3 | $7.0 \times 10^4$ |
| 4 | 7 | 1:1026 | 4.3 | $4.2 \times 10^4$ |
| 5 | 27 | * | 6.3 | * |

*Same as bead #2 without any FITC, used for determination of background autofluorescence.

EXAMPLE 7

One ml of a solution prepared by dissolving 4 mg of Texas Red in 3 ml of DMF was diluted with an additional 4 ml of DMF. Five ml aliquots of the 1% suspension of the microbeads in sodium carbonate-polysorbate 20 from Example 5 were treated with 0.3 ml each of the above Texas Red-DMF solutions. The microbeads were stirred in the dye solutions for 1 hour, washed and the relative fluorescence of the two aliquots was determined. The ratio of the intensities of the fluorescence of the microbeads stirred in the two dye solutions was 3.4:1.

EXAMPLE 8

Five ml of the sodium carbonate-polysorbate 20 suspension of microbeads from Example 5 were stirred with 0.3 ml of FITC/DMF solution for 1 hour. The microbeads were washed three times with 0.1 m sodium carbonate solution containing 0.1% polysorbate 20, then mixed with 0.3 ml of the Texas Red/DMF solution from Example 7. After washing with 0.1% sodium carbonate solution containing 0.1% polysorbate 20, the microbeads showed both red and green fluorescence under the fluorescent microscope.

In summary, the present invention relates to fluorescently labeled microbeads and a method for their preparation. Polymeric micro-particles are swelled to a predetermined size by absorption and internal polymerization of a monomer having a reactive functional group. Sequential reaction with a polyfunctional spacing agent and a fluorescent dye provides the microbead with a detectable label. When the labeled microbead is the same size as a cell, it can be used as a flow cytometry standard.

What is claimed is:

1. Microbeads comprising polymeric seed particles, a swelling agent having a molecular weight less than about 300 and a solubility in water less than about $10^{-2}$ grams per liter and from about 0.1% to about 50% by weight of a polymer of the formula

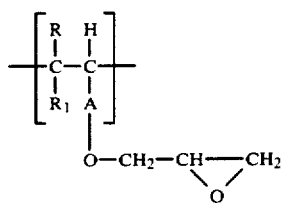

wherein R and $R_1$ are independently selected from the group consisting of hydrogen and lower alkyl of 1 to 6 carbon atoms and A is selected from the group consisting of a methylene or carbonyl group, said microbeads having a diameter from about 1 to 50 microns and having a size distribution within 10% of the mean.

2. Microbeads comprising polymeric seed particles, a swelling agent selected from the group consisting of a hydrocarbon and a halogenated hydrocarbon, said swelling agent having about 10-16 carbon atoms, and from about 0.1% to about 50% by weight of a polymer of the formula:

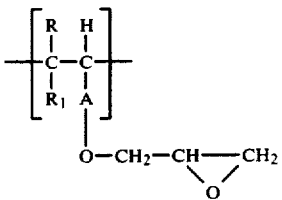

wherein R and $R_1$ are independently selected from the group consisting of hydrogen and lower alkyl of 1 to 6 carbon atoms and A is selected from the group consisting of a methylene or carbonyl group, said microbeads having a diameter from about 1 to 50 microns and having a size distribution within 10% of the mean.

3. The microbeads of claim 2 wherein said halogenated hydrocarbon is a chlorinated hydrocarbon.

* * * * *

Disclaimer and Dedication 4,698,262.—*Abraham Schwartz*, Durham; *Joel Williams*, Cary; *Robert D. Stevens*, Durham, all of N. C. FLUORESCENTLY LABELED MICROBEADS. Patent dated Oct. 6, 1987. Disclaimer and Dedication filed Feb. 14, 1991, by the assignee, Becton, Dickinson and Co.

Hereby disclaims and dedicates to the Public the remaining term of said patent.
[ *Official Gazette April 30, 1991* ]